United States Patent [19]

Grosse

[11] Patent Number: 4,583,452
[45] Date of Patent: Apr. 22, 1986

[54] FOOD HOLDER FOR BARBECUE ROTISSERIE

[76] Inventor: Eric F. Grosse, 3630 Foxcroft Rd., Charlotte, N.C. 28211

[21] Appl. No.: 630,869

[22] Filed: Jul. 13, 1984

[51] Int. Cl.⁴ ............................................. A47J 43/18
[52] U.S. Cl. ........................................ 99/427; 99/449; 99/450
[58] Field of Search ................ 99/348, 421 R, 421 H, 99/427, 450, 402, 429, 393, 449; 126/9 B

[56] References Cited

U.S. PATENT DOCUMENTS

| | | | |
|---|---|---|---|
| 2,102,097 | 12/1937 | Sherman | 99/402 X |
| 2,938,450 | 5/1960 | Carpenter | 99/427 |
| 3,049,072 | 8/1962 | Smith | 99/427 |
| 3,084,615 | 4/1963 | Smith | 99/427 X |
| 3,163,103 | 12/1964 | Shoup | 99/427 |
| 3,285,160 | 11/1966 | Smith | 99/427 |
| 3,315,591 | 4/1967 | Elliott | 99/421 R |
| 3,797,379 | 3/1974 | Brion | 99/426 X |
| 3,867,877 | 2/1975 | Zajc | 99/421 HV X |
| 3,922,961 | 12/1975 | Case | 99/427 |
| 4,165,683 | 8/1979 | Van Gilst | 99/427 X |
| 4,442,763 | 4/1984 | Beller | 99/427 |

Primary Examiner—Billy J. Wilhite
Attorney, Agent, or Firm—W. Thad Adams, III

[57] ABSTRACT

A food holder 10 for a barbecue rotisserie is disclosed. The food holder 10 includes a rigid, planar frame 11 which defines an unobstructed food encompassing void within which the food may be positioned without being pierced. First and second coaxial rods 12 and 13 are secured to opposite ends of frame 11 to form a rigid unit and extend outwardly for mounting frame 11 for rotation on a barbecue grill. First and second pairs of outwardly and radially extending spokes 16, 17 and 18, 19 are mounted on and carried, respectively, by opposite ends of frame 11 for rotation therewith. First and second food support members 22, 23; 31, 32; 41, 42; and 51, 52; are provided for being mounted on spokes 16, 17 and 18, 19 and being secured thereto with wing nuts 21. The food support members cooperate with each other and with frame 11 to define enclosures within which food may be placed without obstruction.

9 Claims, 9 Drawing Figures

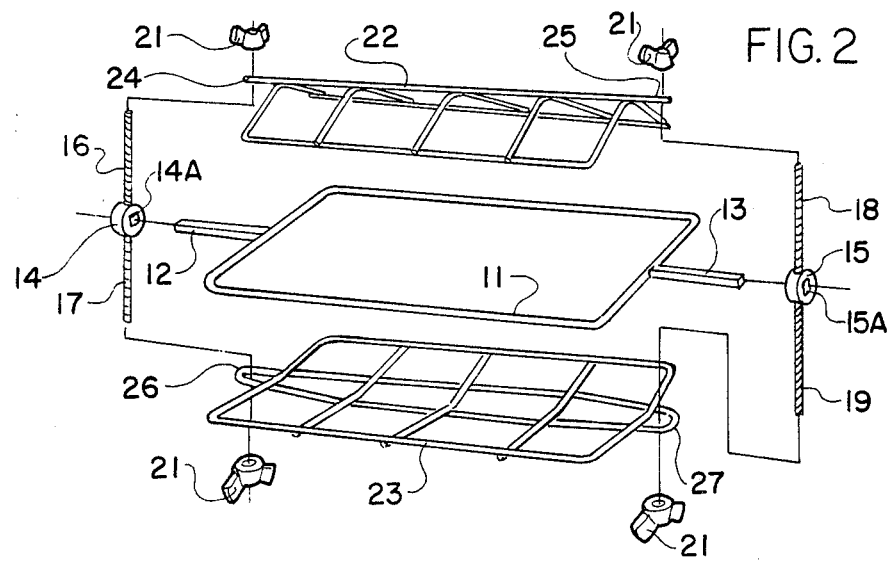
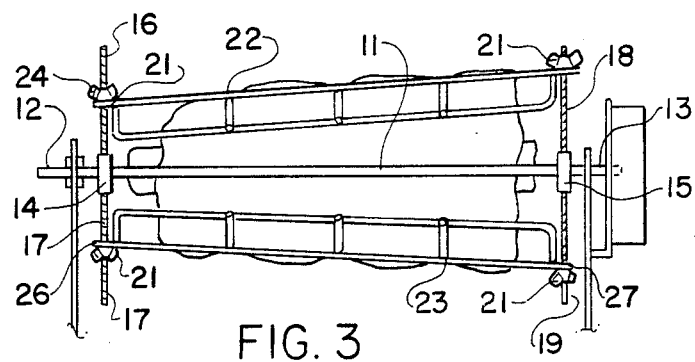
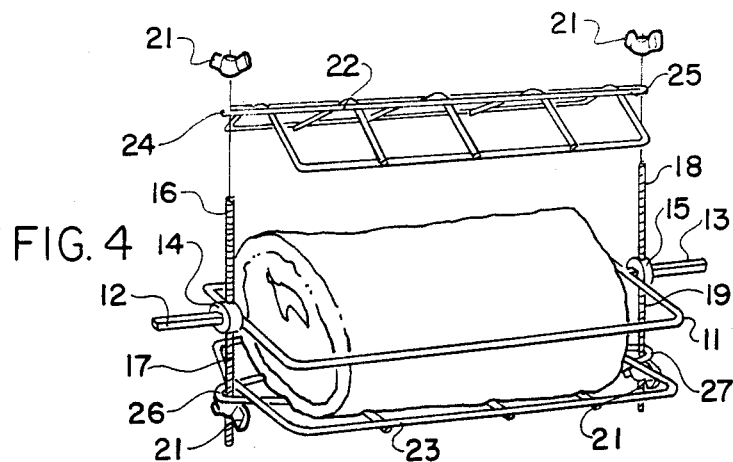

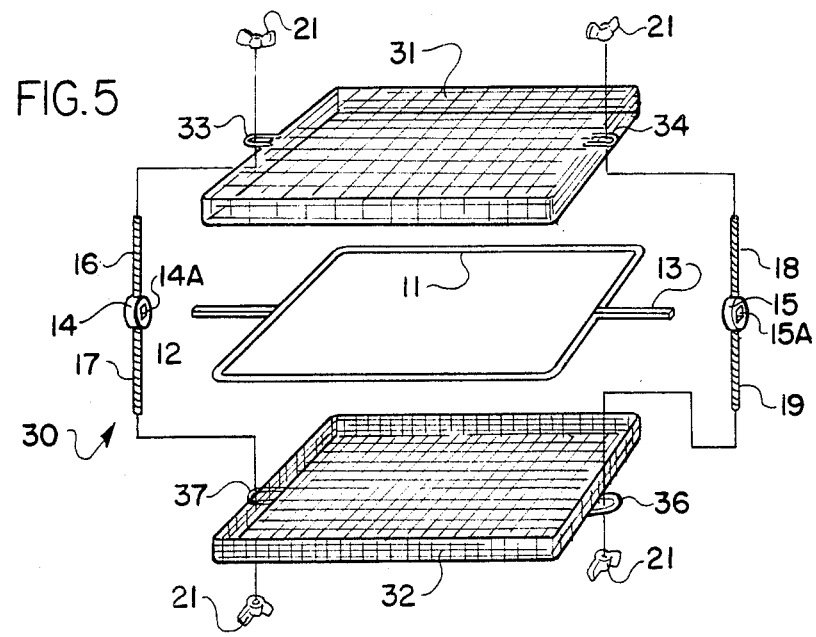
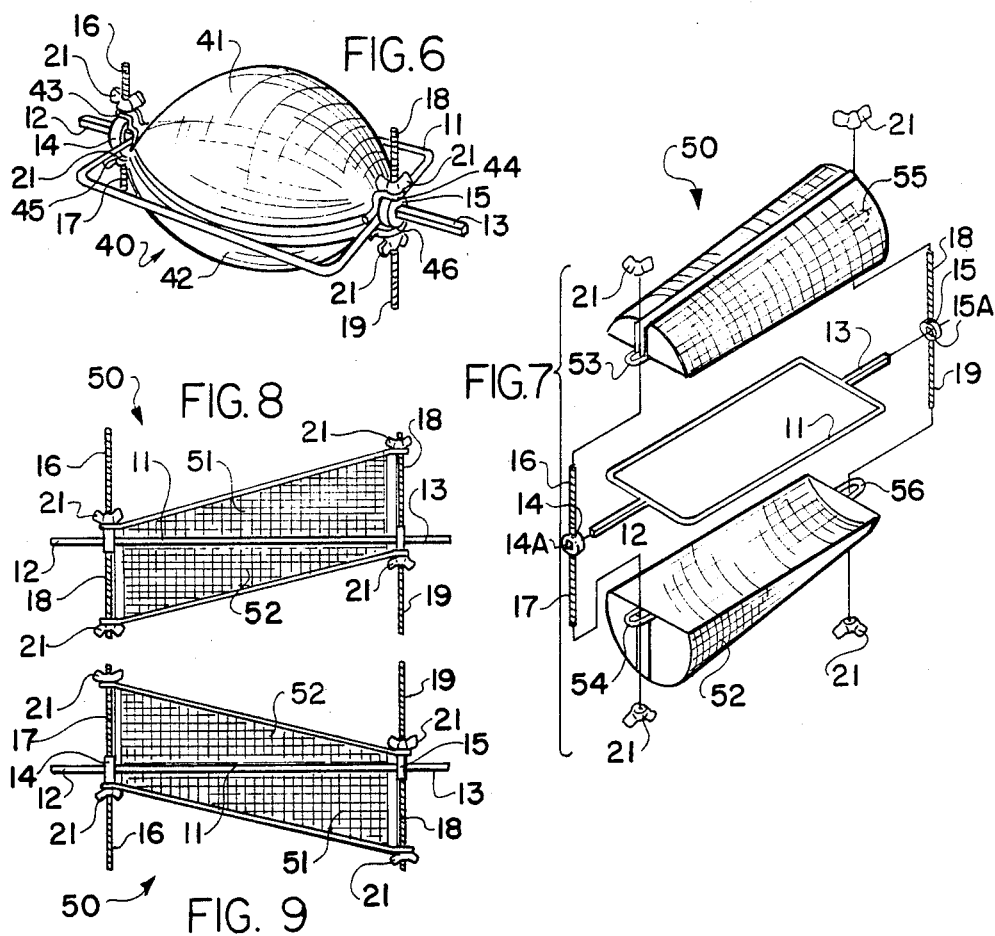

FOOD HOLDER FOR BARBECUE ROTISSERIE

TECHNICAL FIELD AND BACKGROUND OF THE INVENTION

This invention relates to a food holder for a barbecue rotisserie. A number of different embodiments of a food holder according to this invention are disclosed in this application. All of the embodiments have as a common element the provision of a rigid frame extending from one side of the grill to the other and having an unobstructed food encompassing void.

Many types of food holders or barbecue rotisseries are shown in the prior art. Ordinarily, a barbecue rotisserie includes a conventional natural gas or bricquet-type barbecue grill across the top opening of which is mounted an elongate shaft or rod. This shaft is mounted for rotation by an electric motor or hand crank. Usually, the food is speared onto the shaft and held by other short spikes so that the food rotates with the rotation of the shaft. The prior art also discloses many types of containers which are usually mounted to one side of or around the shaft and which are intended to enclose a number of relatively small food items.

These types of devices are well known and commonly used. However, they present a number of disadvantages which heretofore have been difficult to overcome. An ideal rotisserie device should be adjustable to accommodate a wide range of foods such as small chicken pieces to relatively large pieces of meat such as shoulders, sides and legs.

Such a device should also be adjustable in order to position the food symmetrically on the rotisserie so that the motor can rotate the food at a constant rate of rotation with the same amount of torque. If the food is symmetrically positioned, it cooks better since all sides of the food receive essentially the same amount of heat.

Ideally, such a device should also provide an unobstructed area for the food. This means that a centrally positioned, rotating shaft should not be used nor should the food be pierced or punctured and rotated on the shaft in that manner. Finally, the rotisserie should be rigid from one side to the other so that parts do not work loose as cooking takes place. Unless the food is rigidly supported from one end of the grill to the other, expansion and contraction of the metal parts as cooking takes place will loosen clamps, wing nuts, and the like, causing the food to become unbalanced on the rotisserie or to fall off the rotisserie into the fire. Likewise, shrinkage of the food can cause it to become loose on the rotisserie.

To applicant's knowledge, no prior art rotisserie device has accomplished all of these objectives.

In particular, the Zajc U.S. Pat. No. 3,867,877, discloses a relatively shallow wire basket mounted on a shaft which extends from one rotisserie support to another. By mounting the basket on top of the shaft, an unobstructed food enclosure within the basket is created. However, the basket is completely asymmetrical to the rotation of the shaft. This means as the basket rotates, constantly varying stress is placed on the rotisserie motor. In addition, the asymmetrical positioning of the basket means that one side of the food receives substantially more heat than the other sides since one side is closer to the fire.

The Brion U.S. Pat. No. 3,797,379, discloses a barbecue meat holder having rotatable spaced hubs with aligning stub shafts. Clamping bars extend from one end of the rotisserie to the other and can be adjusted to support a piece of meat. While the construction shown in Brion provides an unobstructed food enclosure, it does not provide a rigid structure from one side to the other which will resist constant rotation and constant expansion and contraction caused by extreme temperature variation. Furthermore, the device cannot be adjusted to position a large, asymmetrical piece of meat in a symmetrical position relative to the rotisserie. Therefore, as is shown in the patent, only a round, relatively symmetrical piece of meat is suitable for use on this device.

Some of the disadvantages recited above have been eliminated in a rotisserie device distributed by Paramount Housewares. The device is similar in many respects to that shown in Brion, but relies on two-diametrically opposed racks which can be independently adjusted, side to side on a T-shaped members which extend inwardly from opposite sides of the grill. An unobstructed food enclosure is therefore provided but the device exhibits a marked lack of rigidity and stability which renders it substantially unsuitable for large, asymmetrical pieces of meat or on any occasion where long cooking times are required.

SUMMARY OF THE INVENTION

Therefore, it is an object of the invention to provide an improved food holder for a barbecue rotisserie which is adjustable to enable food to be symmetrically positioned thereon for even cooking without undue stress on the rotisserie motor.

It is another object of the present invention to provide a food holder for a barbecue rotisserie which is adjustable to accommodate a wide range of sizes and types of food items.

It is yet another object of the present invention to provide a food holder for barbecue rotisserie which is rigid from one side to the other in order to prevent loosening and misadjustment of the food as the cooking takes place.

It is yet another object of the present invention to provide a barbecue rotisserie which is rigid from one side to the other but which nevertheless provides a completely unobstructed area within which the food may be positioned, held and rotated for cooking.

It is still another object of the present invention to provide a food holder for a barbecue rotisserie which holds the food securely for cooking without piercing or puncturing the food.

These and other objects and advantages of the present invention are achieved in the preferred embodiments of the invention described below by providing a rigid, planar frame defining an unobstructed food encompassing void within which the food may be positioned without being pierced. First and second coaxial rods are fixedly secured, respectively, to opposite ends of said frame to form a rigid unit and extend outwardly therefrom for mounting the frame for rotation on a barbecue grill.

First and second pairs of outwardly and radially extending spokes are mounted on and carried by opposite ends of the frame for rotation therewith. First and second food support members having fasteners thereon are carried, respectively, by the first and second pairs of spokes in opposite, spaced-apart, food supporting relation to the frame.

According to one embodiment of the invention, the first and second support members each comprise racks which are mountable on the spokes in opposition to each other and an opposite sides of the frame. The first and second racks cooperate with each other to support a piece of food therebetween without obstruction.

According to another embodiment of the present invention, the first and second support members each comprise hollow basket members having an opening adapted for substantial mating engagement to collectively define a closed basket in which small food items can be placed for cooking.

According to various embodiments of the invention, the closed basket may be spheroid-like, parallelogramic to cause the food items within the food basket to tumble from one side of the basket to the other as the basket rotates, or may be in the form of shallow tray having a flat bottom and, low, perpendicular sides.

Preferably, the first and second basket members according to the above-described embodiments matingly engage opposite sides of the frame along substantially its entire peripheral extent. This provides enhanced rigidity to the barbecue rotisserie and securely encloses the food within the basket.

BRIEF DESCRIPTION OF THE DRAWINGS

Some of the objects of the invention have been set forth above. Other objects and advantages of the invention will appear as the description of the invention proceeds, when taken in conjunction with the following drawings, in which:

FIG. 2 is an exploded, perspective view of one embodiment of the invention wherein the support members comprise racks;

FIG. 3 is a side, elevational view of the food holder shown in FIG. 2 in position on a rotisserie and enclosing an asymmetrical piece of meat;

FIG. 4 is a perspective view of the food holder shown in FIG. 3, illustrating that the meat may first be supported within the holder and then adjusted to provide proper symmetry;

FIG. 5 is an exploded, perspective view of another embodiment of the present invention wherein the food support members comprise shallow, flat bottom baskets;

FIG. 6 is a perspective view of another embodiment of the present invention wherein the food support members are dome shaped and define a spheroid basket;

FIG. 7 is an exploded perspective view of an embodiment of the invention wherein each basket member has a semi-frustum shape;

FIG. 8 is a side elevational view of the basket members shown in FIG. 7 in proper position on the frame; and FIG. 9 shows the basket in FIG. 8 after rotating it 180 degrees.

DESCRIPTION OF THE PREFERRED EMBODIMENT

Figure 1:
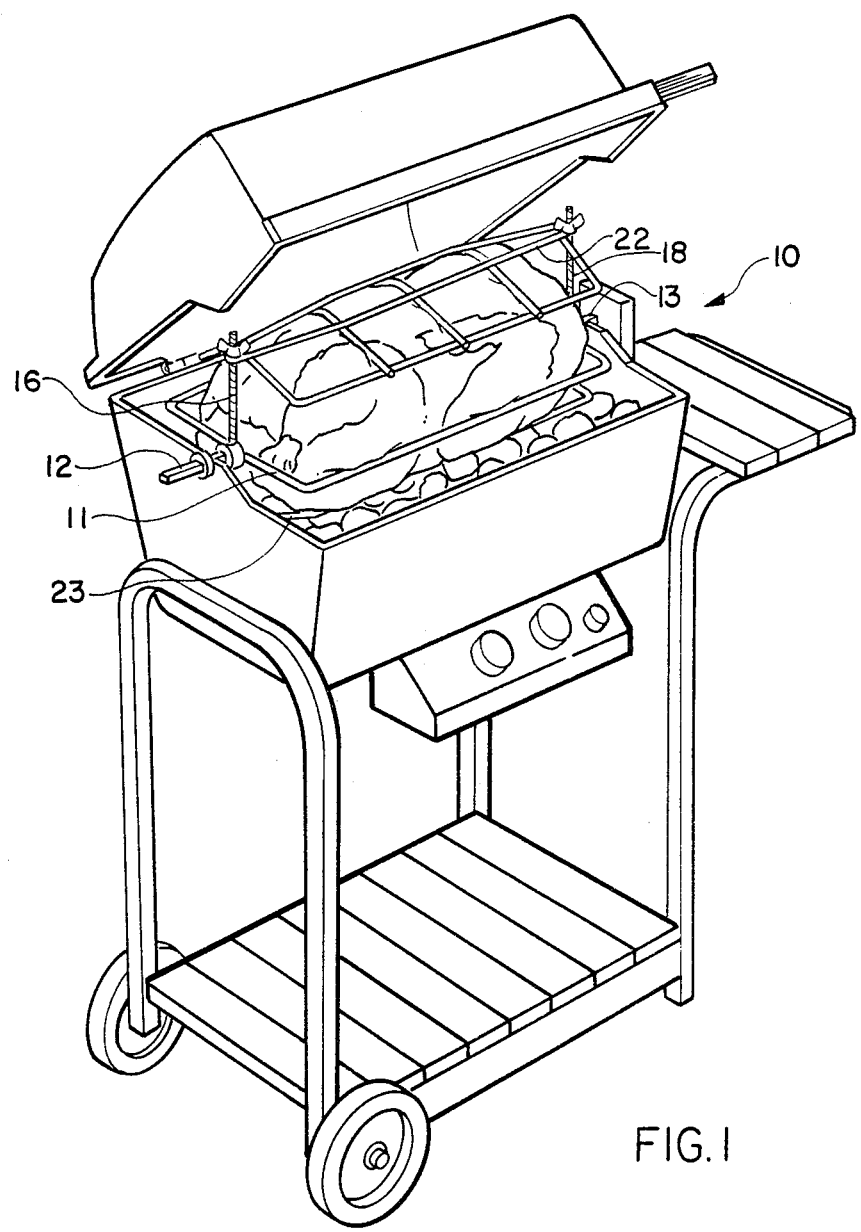
FIG. 1 is a perspective view of one preferred embodiment of the invention mounted on a conventional barbecue grill.

Referring now specifically to the drawings, a food holder for a barbecue rotisserie according to the present invention is generally shown and illustrated in FIG. 1 and indicated at broad reference numeral 10. Generally, food holder 10 comprises a rigid frame 11 supported on opposite ends by coaxial rods 12 and 13. As is also shown, a relatively large piece of food is supported for rotation within frame 11 by means of two, spaced-apart wire racks 22 and 23.

Referring now to FIG. 2, food holder 10 will be described in further detail. Frame 11 comprises a single piece of rectangularly formed, heavy gauge steel wire. Coaxial rods 12 and 13 are welded to opposite ends of frame 11 and permit frame 11 to be mounted for rotation on a rotisserie. Rods 12 and 13 are squared and cross-sectioned. A collar 14 having a mating, square void 14a is mounted on rod 12 and rotates therewith.

Likewise, a collar 15 having a mating, square void 15a therein is mounted on rod 13 for rotation therewith. Mounted on collars 14 and 15 and extending radially outwardly therefrom are first and second pairs of spokes 16, 17 and 18, 19, respectively. Spokes 16, 17, 18 and 19 are each threaded to receive matingly threaded wing nuts 21. As is shown, the threading on spokes 16, 17, 18 and 19 extends substantially along their entire length to permit the widest possible range of adjustment, as will be described below. Still referring to FIG. 2, the pair of opposing food support members, comprising wire racks 22 and 23 support the food in the proper position relative to frame 11. Rack 22 is provided with outwardly extending and integrally formed closed hooks 24 and 25 which are received over outwardly extending spokes 16 and 18, respectively. Likewise, rack 23 is provided with outwardly and integrally formed closed hooks 26 and 27 which are received over outwardly extending spokes 17 and 19, respectively. The wing nuts 21 are then threaded onto their respective spokes 16, 17, 18 and 19.

Referring now to FIG. 3, wing nuts 21 have been threaded onto spokes 16, 17, 18 and 19 to the point where racks 22 and 23 each, respectively, bear against the piece of meat along substantially their entire length from one side to the other. Hooks 24, 25, 26 and 27 are each relatively oversized compared to the diameter of spokes of 16, 17, 18 and 19. This permits a degree of adjustability of these components away from the perpendicular to permit the symmetrical positioning of asymmetrical pieces of meat relative to frame 11, as is shown in FIG. 3.

Referring now to FIG. 4, the preferred manner of centering the meat is to first place rack 23 on spokes 17 and 19 and thread wing nuts 21 to the point where the extended center line of rods 12 and 13 would intersect the center of the meat. Then, rack 22 is placed in position over spokes 16 and 18 and wing nuts 21 threaded thereon. Any minor adjustment which is necessary can be made simply by adjusting the position of the wing nuts 21 as necessary.

As can be seen, frame 11 defines a completely unobstructed void within which the food item can be positioned. Rods 12 and 13 support frame 11 on the rotisserie and provides a rigid structure which resists loosening as the rotisserie rotates and cooking takes place. Despite the high degree of rigidity and stability provided, the food is not pierced and therefore many different types of foods can be cooked without regard to whether they have bones and without their degree of asymmetry.

A variety of other racks can be used in combination with frame 11, all with equally good results.

Referring now to FIG. 5, a basket 30 is formed of a pair of relativley shallow basket trays 31 and 32 are shown. Trays 31 and 32 are each constructed of suitably gauged steel wire and are provided with closed loops 33, 34 and 35, 36 respectively. These loops are received over spokes 16, 17, 18, and 19 in the manner shown in FIGS. 1 through 4. In the embodiment shown in FIG. 5, the outer peripheral extent of trays 31 and 32 have the same dimensions as and therefore mate with the frame 11. This provides a rigid and stable enclosure within which relatively small food items may be placed. The basket 30 which is formed is completely symmetrical and provides a completely unobstructed enclosure within which the food may be placed.

Another embodiment is shown in FIG. 6 and comprises a substantially spheroid-shaped basket 40 comprised of hollow basket members 41 and 42. Basket member 41 includes closed loops 43 and 44 secured to opposite sides thereof, and basket member 42 includes closed loops 45 and 46 secured to opposite sides thereof as well. As is shown in FIG. 6, loops 43, 44, 45 and 46 are bent slightly so that the basket members 41 and 42 will close completely, with the loops 43, 44, 45 and 46 positioned on opposite surfaces of collars 14 and 15, respectively. Basket members 41 and 42 are also constructed of suitably gauged steel wire and are particularly adapted for enclosing many small pieces of food such as shrimp which are tumbled from side to side as cooking takes place. In the embodiment shown in FIG. 6, the mating edges of basket members 41 and 42 do not mate against the opposite surfaces of frame 11 but against themselves. However, frame 11 could be constructed in a suitable circular or oval shape if desired.

Referring now to FIG. 7, yet another embodiment of the invention is shown and broadly indicated at reference numeral 50. Basket 50 is comprised of two basket members 51 and 52, each of which are shaped as semi-frustums and are constructed of suitably gauged steel wire. Basket members 51 and 52 include loops 53, 54 and 55, 56 respectively for being received over spokes 16, 17 and 18, 19, as described above. One end of basket segments 51 and 52 have a substantially greater diameter than the other end. The curved outer surface of basket members 51 and 52 defines the frustum shape and the basket members 51 and 52 are turned with the small diameter end of one mating with the large diameter end of the other. The outer periphery of the opening of basket members 51 and 52 corresponds with and mates to the frame 11 so that the basket 50 is formed.

Referring now to FIG. 8, basket 50, in elevation, is parallelogramatic, meaning simply that as basket 50 rotates the food contained within the basket is constantly shifted slightly from one side towards the other. Upon rotation of 180 degrees from the position shown in FIG. 8, basket 50 assumes a position shown in FIG. 9. Consequently, a large number of small food items within the basket 50 will be cooked thoroughly and evenly on all sides as basket 50 rotates since they will be constantly tumbled from one side to the other.

Each of the embodiments above provides a food enclosure which is adjustable to symmetrically position many types of food items for even cooking and even strain on the rotisserie motor. The particular embodiments shown in this application permit a wide range of foods to be cooked on a rotisserie. In all cases, a rigid structure is provided which will withstand rotation over a long period of time without loosening. Likewise, an unobstructed area is provided for the food items so that puncturing the food to place it on a rotating shaft is not necessary.

A food holder for a barbecue rotisserie is described above. Various details of this invention may be changed without departing from its scope. Furthermore, the foregoing description of the preferred embodiments of the invention is provided for the purpose of illustration only and not for the purpose of limitation—the invention being defined by the claims.

I claim:

1. A food holder for a barbecue rotisserie, comprising:
   (a) a rigid, planar frame defining an unobstructed food encompassing void therein, within which void food may be positioned without being pierced;
   (b) first and second coaxial rods fixedly secured to and carried, respectively, by opposite ends of said frame to form a rigid unit, said rods extending outwardly from said frame for mounting the frame for rotation on a barbecue grill, said rods being squire in cross-section;
   (c) first and second pairs of outwardly and radially extending spokes fixedly secured to and carried, respectively, by collars having a square bore therein for being mounted opposite concentrically on said coaxial rods of said frame for rotation therewith;
   (d) a first food support member having fastening means for being releasably fastened to and carried by one each of said first and second pairs of spokes in food supporting relation to said frame;
   (e) a second food support member having fastening means for being releasably fastened to and carried by the other one of said first and second pairs of spokes in food supporting relation to said frame and in opposition to said first support member whereby the food is supported on opposite sides by said first and second support members in predetermined relation to said frame and supported by said frame rigidly and securely in relation to heat as the rotisserie rotates.

2. A food holder according to claim 1 wherein said first and second support members each comprise racks, said racks mountable on said spokes in opposition to each other on opposite sides of said frame an cooperating with each other to support a piece of food without obstruction therebetween.

3. A food holder according to claim 1 wherein said first and second support members each comprise hollow basket members having an opening adapted for substantial mating engagement with each other to collectively define a closed basket within which small food items can be placed for cooking on the rotisserie.

4. A food holder according to claim 3 wherein each hollow basket member comprises a symmetrical, semi-spheroid like dome being matable to each other and which collectively defines a hollow spheroid-like closed basket within which small food items can be placed for cooking on the rotisserie.

5. A food holder according to claim 3 wherein each hollow basket member comprises a semi-frustum with one end having a relatively large radius and the other end having a relatively small radius, said first and second hollow basket members being matable to each other with the relatively large radius end of said first basket member adjacent the small radius end of the second basket member to define, in plan view, a parallelogramatic hollow closed basket which causes the small food items within the food basket to tumble from one side of the basket to the other as the basket rotates, thereby evenly cooking and browning the food.

6. A food holder according to claim 3 wherein each hollow basket member comprises a shallow tray having a flat bottom and perpendicular, low sides, the upper edges of said sides mating with each to define a hollow, unobstructed basket within which food items can be placed for cooking on the rotisserie.

7. A food holder according to claim 1, wherein said spokes are threaded and said fastening means comprises an outwardly extending, U-shaped hook carried by said first and second food support members for receiving said threaded spokes, and matingly threaded wing nuts for positioning and retaining said hooks on said threaded spokes at a predetermined food supporting position.

8. A food holder according to claim 1 wherein said frame is rectangular.

9. A food holder according to claim 3 wherein said first and second basket members matingly engage opposite sides of said frame along substantially its entire peripheral extent.

* * * * *